United States Patent [19]

Scarpati et al.

[11] 4,095,322

[45] Jun. 20, 1978

[54] METHOD OF FABRICATING A COMPOSITE AERODYNAMIC ROTOR BLADE ASSEMBLY

[75] Inventors: Thomas S. Scarpati, Mt. Laurel, N.J.; Robert J. Ford, Bromall, Pa.

[73] Assignee: The Boeing Company, Seattle, Wash.

[21] Appl. No.: 718,796

[22] Filed: Aug. 30, 1976

[51] Int. Cl.² .......................... B23P 15/00; B23P 9/00; B32B 1/10; B32B 3/12

[52] U.S. Cl. .................................. 29/156.8 P; 29/423; 416/226; 416/230; 156/182; 156/245

[58] Field of Search .................... 29/156.8 B, 156.8 H, 29/423, 445, 156.8 P; 416/226, 241 A, 230; 156/245, 182

[56] References Cited

U.S. PATENT DOCUMENTS

| | | | |
|---|---|---|---|
| 2,965,530 | 12/1960 | Stamm et al. | 29/446 |
| 2,988,809 | 6/1961 | Hall | 29/423 |
| 3,028,292 | 4/1962 | Hinds | 416/230 |
| 3,217,807 | 11/1965 | Underhill, Jr. et al. | 416/226 |
| 3,237,697 | 3/1966 | Ford et al. | 416/226 |
| 3,413,708 | 12/1968 | Norville et al. | 29/423 |
| 3,552,881 | 1/1971 | Rogers et al. | 416/226 |
| 3,672,031 | 6/1972 | Negrini | 29/445 |
| 3,782,856 | 1/1974 | Salkind et al. | 416/230 |
| 3,799,700 | 3/1974 | Broekhuizen et al. | 416/226 |
| 3,967,996 | 7/1976 | Kamov et al. | 416/226 |

FOREIGN PATENT DOCUMENTS

| | | | |
|---|---|---|---|
| 1,067,771 | 5/1967 | United Kingdom | 416/226 |

*Primary Examiner*—C.W. Lanham
*Assistant Examiner*—Daniel C. Crane
*Attorney, Agent, or Firm*—Felix J. D'Ambrosio; Edwin E. Greigg; Jack D. Puffer

[57] ABSTRACT

What follows is a description of a method of fabricating a composite assembly. In particular, the composite assembly comprises an aerodynamic rotor blade assembly which is fabricated utilizing a single matched die mold. Before utilizing the single matched die mold, the aft fairing structure of the composite blade assembly is formed. This aft fairing structure is uniquely characterized in that it includes not only the typical elements of an aft fairing structure of the composite blade, but the spar heel as well. The aft fairing structure thusly formed is then placed into the single matched die mold with the spar, nose block, cap member and deicing blanket, or with various subassemblies thereof, and the various parts brought into engagement and secured to each other in the single matched die mold through the application of heat and pressure.

66 Claims, 8 Drawing Figures

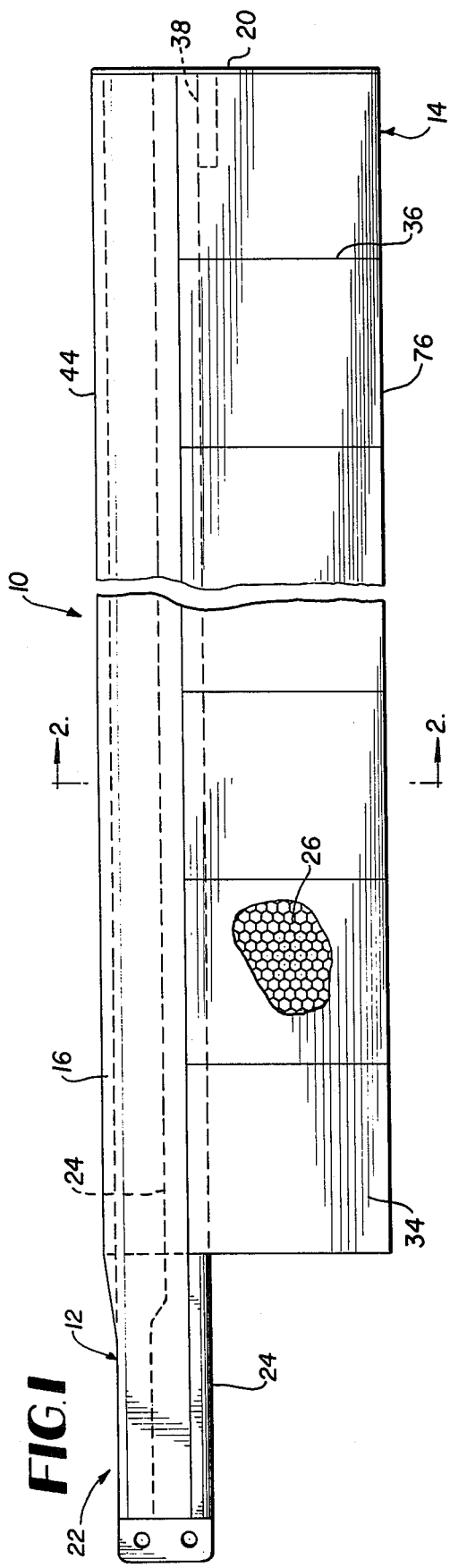
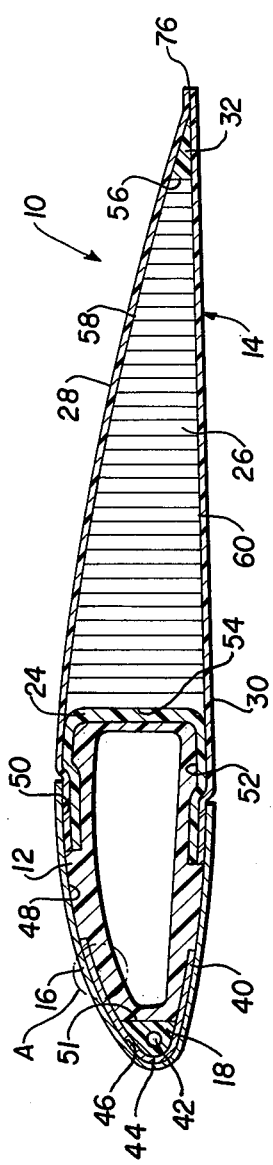

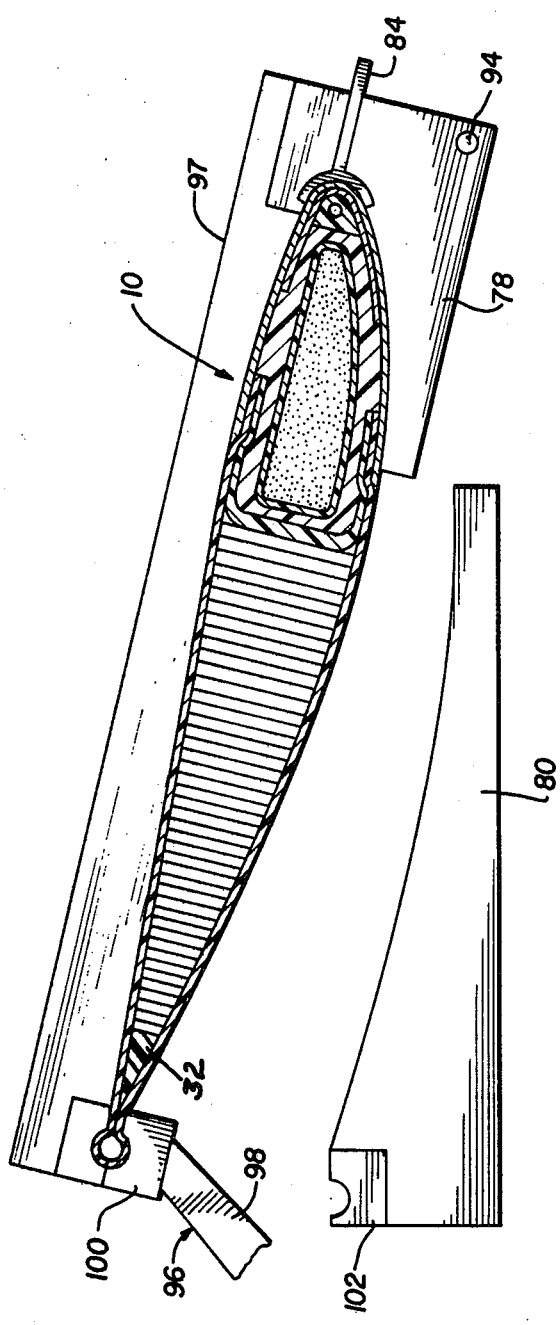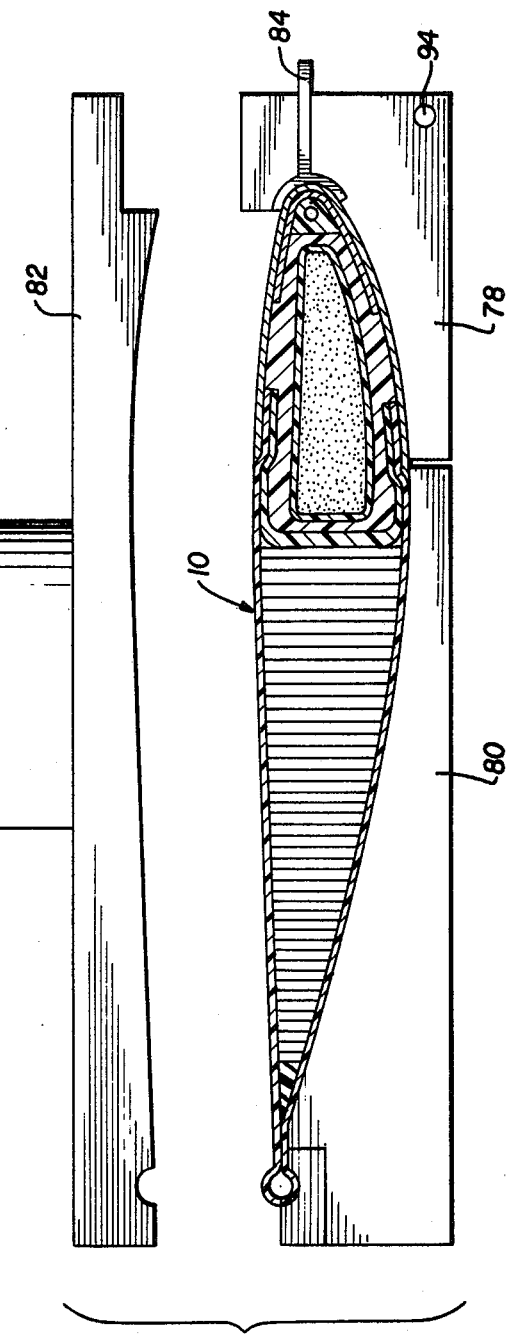

METHOD OF FABRICATING A COMPOSITE AERODYNAMIC ROTORBLADE ASSEMBLY

CROSS-REFERENCE TO RELATED APPLICATION

This application discloses subject matter in common with our copending application Ser. No. 718,543, filed on Aug. 30, 1976, and entitled "COMPOSITE AERODYNAMIC ROTOR BLADE ASSEMBLY".

BACKGROUND OF THE INVENTION

This invention relates to a method of fabricating a composite structure, and, in particular, a composite aerodynamic rotor blade assembly, such as a helicopter rotor blade assembly in which the final assembly stage is performed in a single, matched die mold, thereby providing the existing state-of-the-art with a low cost and minimum operation production oriented means of fabrication.

From the very advent of the composite rotor blade, those skilled in the art have sought to reduce the cost of manufacture by in some way reducing or changing the varius stages of-fabrication. Still, however, composite rotor blades are fabricated by joining a number of separately fabricated subassemblies; and, for the most part, as multicured subassemblies requiring separate bonding assembly jigs for each major cure subassembly.

For example, in a known method of fabricating a composite rotor blade, the following subassemblies are produced:

1. blade cap member, deicing blanket and nose block subassembly;
2. blade spar subassembly;
3. blade spar and cap member, deicing blanket and nose block subassembly;
4. blade trailing edge wedge subassembly;
5. blade aft fairing core, (unmachined) with one skin member subassembly;
6. blade aft fairing core (machined) with both skin members subassembly;
7. Final assembly including subassemblies 3–6.

As can readily be seen, this assembly includes at least seven curing and/or bonding operations.

It would, therefore, be desirable to be able to reduce the total number of curing and/or bonding operations now required to fabricate a composite rotor blade and thereby reduce the cost of fabrication.

Of the various subassemblies mentioned above, one of the most limiting to the achievement of production economy is the spar subassembly. For example, in one known method of fabrication which employs curing, it has been found that a back pressure has to be provided against the rear face of the spar to counteract the internal bag pressure acting within the spar during the curing cycle. In the past the only successful way to do this way by forming the spar separately in a mold. In another known method of fabrication which employs curing, it was decided to fabricate the spar heel separately from the spar and to then include the spar heel in assembly with the spar during the spar curing cycle. This procedure, however, did not prove satisfactory because, for one thing, the spar developed undesirable surface wrinkles.

Since the spar is a key element in the rotor blade, and since it has had to be fabricated separately for at least the reason stated above, it can be readily appreciated that optimization in fabrication can be achieved by providing a method in which the spar need not be fabricated as a separate subassembly.

It would, therefore, be desirable to provide a method of fabricating a composite rotor blade according to which the spar need not be separately assembled and does not develop any undesirable conditions detrimental to the proper employment of the spar.

OBJECTS AND SUMMARY OF THE INVENTION

It is, therefore, an object of this invention to teach a method of fabricating a composite structure, which preferably comprises a composite aerodynamic rotor blade assembly, employing fewer steps than has been suggested heretofore, thereby resulting in overall cost reduction.

It is a related object of this invention to teach the method referred to in the previous object while at the same time not sacrificing any of the structural integrity of the composite structure. In particular, the structural integrity of the composite aerodynamic rotor blade assembly is retained intact by the method stated in the previous object.

It is another object of this invention to teach the method referred to in the first object according to which the spar heel is separately fabricated and thereafter included in the fabrication of the aft fairing structure.

It is a further object of this invention to teach the method referred to in the first object according to which at least the first three subassemblies mentioned above in reference to the known fabricating method are eliminated.

It is still another object of this invention to teach the method referred to in the first object according to which the final assembly of the composite structure is achieved using a single matched die mold.

In all of its aspects this invention achieves these objects by including the spar heel as part of the aft fairing structure. In this way, for example, the need to produce three separate subassemblies, namely: the cap member, deicing blanket and nose block; the spar; the spar, the cap member, deicing blanket and nose block, can be eliminated from the fabrication process. The aft fairing structure with the spar heel included is capable of withstanding the bag pressure acting within the spar during its formation so that a back pressure from a mold is not necessary. It is this feature of the invention which permits the use of a single matched die mold where the cap member, deicing blanket, nose block and spar are included, either as assembled elements with the aft fairing structure to subsequently form the composite blade, or as various subassemblies to subsequently form the composite blade with the aft fairing structure.

In one of its broader aspects, this invention achieves these objects by separately forming the aft fairing structure and then placing the formed aft fairing structure into the single matched die mold with the spar, the cap member, the nose block and the tip cover for final assembly. It is possible, if desired, to initially procure all of the individual elements of the composite structure as structural members, and thereafter form the aft fairing structure and then the final assembly employing an adhesive material to secure the various mating surfaces of the elements.

It is also possible, if desired, to procure some of the elements and form the remaining elements in the course of forming the aft fairing structure and the final assembly.

It is also possible, and in fact preferred, to form most elements while forming the aft fairing structure and the final assembly utilizing material susceptible to curing.

BRIEF DESCRIPTION OF THE DRAWINGS

FIG. 1 is a top plan view of a helicopter rotor blade which is fabricated according to the method of this invention.

FIG. 2 is a cross-sectional view of the rotor blade of FIG. 1 taken along the line 2—2 of FIG. 1.

FIGS. 3–7 illustrate various stages of development in the fabrication of the composite rotor blade according to the method of this invention.

DESCRIPTION OF THE PREFERRED EMBODIMENTS

Figure 8:
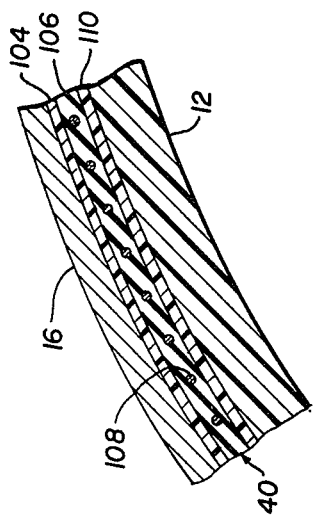
FIG. 8 is a detailed illustration of view A of FIG. 2.

Turning now to a more specific description of this invention, attention is directed first to FIGS. 1 and 2 which illustrate details of a composite blade 10 fabricated according to the various method aspects of this invention.

The composite blade 10 includes in its essential parts a spar 12, an aft fairing structure 14, a cap member 16, a nose block 18 and a tip cover 20.

The spar 12 is formed generally as a rounded "D" shaped structure in cross-section with a spanwise transition to a generally rectangular root end section 22 which is fitted into a rotor hub in any conventional manner (not shown). The spar 12 is tubular and acts as the predominate load bearing member of the blade and therefore serves as a carrier to which all other elements are attached to form the composite structure. Because the spar serves as a carrier, its outer surface is shaped to accommodate the other elements of the blade so that in cross section, the blade presents an airfoil shape.

A significant feature of this invention resides in the fact that the aft heel section of the spar is fabricated as a separate element 24 capable of withstanding not only the helicopter's operating flight loads but also, in the case where curing is employed, the temperature and pressure requirements of the various curing cycles to which it is subjected. According to this invention the spar heel 24 is first secured to the aft fairing structure 14 and then attached to the spar 12 as part of the aft fairing structure.

The spar heel 24 is formed generally as a "C" shaped structure in cross-section with a spanwise transition toward the root end section which renders the spar heel compatible with the spar to form the root end of the blade.

The aft fairing structure 14 exclusive of the spar heel 24 includes typically a lightweight core 26, made preferably of foam or honeycomb, an upper skin member 28, a lower skin member 30 and in most cases, a trailing edge wedge 32.

Preferably each of the elements comprising the aft fairing structure possesses a unitary spanwise construction. Alternatively, the elements may comprise any number of discrete boxes 34 each including a core, upper and lower akin members and, in most cases, a trailing edge wedge. In assembly, the boxes are separated by a spacer rib 36 (shown only schematically in FIG. 1). The spacer ribs 36 are preferably made of rubber.

After the aft fairing structure 14 is assembled with the spar heel 24 it is preferably balanced. For this purpose, the spar heel 24 is provided with an extension which serves as a tip weight housing 38. This housing is adapted to accommodate the necessary balancing weights added during the balancing procedure. The procedure itself is well known and need not be discussed in detail. As can be seen in FIG. 1, the blade 10 is closed at its tip end by the tip cover 20.

At the front end of the blade assembly there is preferably provided in addition to the cap member 16 and the nose block 18 a deicing blanket 40. The nose block 18 has formed therein a spanwise extending bore 42 into which a counterweight (not shown) is inserted.

The cap member 16 is preferably made of metal, such as titanium, although it may be made of any non-metallic material capable of protection against erosion. Whether the cap member 16 is made of metal or of a non-metallic material, it includes a non-metallic inboard portion which with the spar 12 and spar heel 24 form the root end of the blade. The root end of the blade has the blade torsion splices (not shown) formed therein. The procedure for forming the torsion splices is well known and is therefore not disclosed in detail.

The various elements discussed above define certain surfaces which will be important to identify in order to better understand the various method aspects of the invention.

The cap member 16 has an outer surface which defines a leading edge 44 of the blade and an inner surface which defines a nose block engaging portion 46, a spar engaging portion 48 and an aft fairing skin member engaging portion 50. The extent of the engagement of each portion is evident from FIG. 2. The nose block engaging portin 46 is shown in FIG. 2 to be in engagement rather with the deicing blanket 40. This is the case where a deicing blanket is incorporated into the blade.

The nose block 18 has a spar engaging surface 51, the spar 12 has an outer surface with a spar heel engaging portion 52, while the core 26 of the aft fairing structure 14 has front, rear, top and bottom surfaces 54, 56, 58 and 60, respectively. Finally the aft fairing structure 14 defines a trailing edge 76 of the blade.

As can be seen in FIG. 2, the outer surface of the spar 12 is so shaped that in the blade assembly it defines a recess 53 along with the cap member 16, and a slot 55 along with the cap member 16 and nose block 18.

Having introduced the various structural elements of the composite blade and their interrelationship, attention will now be directed to a discussion of the various method aspects of the invention utilizing for this purpose FIGS. 3–7. These figures illustrate the different tools used in the course of fabrication to a limited extent sufficient to an understanding of the invention.

As an initial consideration it should be noted that in forming the aft fairing structure 14, the core 26 has its bottom surface 60 cut or machined in a conventional manner to conform it to the inclination of a portion 62 of a bonding assembly jig so that when placed in the jig portion 62 on a skin member, the cell walls of the core are partially oriented or parallel to the spar heel 24 (FIG. 3). Alternatively, the core 26 can be procured with its surface 60 already cut or machined to the inclination of the jig portion 62.

The bonding assembly jig also includes pressure blocks 64 with rubber pads 66 which are placed as shown in FIG. 3. The remaining parts of the bonding assembly jig are not shown although they are known to the skilled artisan.

According to one aspect of the invention, the skin member 30 may be procured in sheet form either in a cured or uncured condition. In either case, the skin member is attached to the surface 60 of the core 26 using any known adhesive for the purpose. The adhesive is preferably applied to the mating surfaces, and the attached core and skin member subjected to heat and pressure in the bonding assembly jig to secure the mating surfaces.

According to a preferred aspect of the invention, the skin member 30 is first layed-up in the jig portion 62, and core 26 positioned as before, the jig assembled and the contents thereof subjected to the heat and pressure of a curing cycle. As a result of the curing, the layed-up skin is formed into a structural member and simultaneously secured to the core 26.

The technique of forming a member by having it layed-up and then cured is well known and need not be discussed here in detail.

After the skin member 30 is secured to the bottom surface 60 of the core 26 according to either of the aspects mentioned above, the top surface 58 is machined to a contoured shape 58'. This contoured surface 58' conforms the top surface of the core to its necessary airfoil shape.

Figure 4:
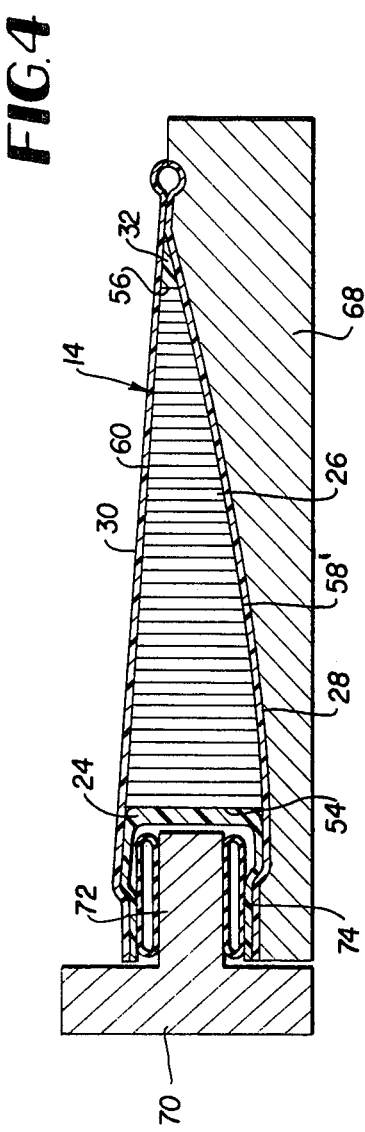

Next, the skin member 28 is placed in a portion 68 of another bonding jig portion, shown only partially in FIG. 4. Then the spar heel 24 is located as shown in FIG. 4 and the machined core 26 and secured skin member 30 also placed in this jig portion with the machined surface 58' in engagement with the skin member 28 and with the skin members and core in engagement with the spar heel 24. When a trailing edge wedge 32 is to be included it can be assembled with the machined core and skin member 30 or it can be placed as shown in FIG. 4 against the skin member 28 and the machined core and seured skin member 30 then placed in the jig portion so that the trailing edge wedge 32 engages the rear surface 56 of the core 26. The placement of the trailing edge wedge 32 precedes placement of the spar heel 24. With the aft fairing structure 14 so assembled the remaining parts of the jig are joined with the portion 68 preparatory to effecting the securing step. One of these parts is a side portion 70 which includes a mandrel 72 and an inflatable bag 74 which extend into the cavity defined by the spar heel 24. The mandrel, of course, lends support to the spar heel during the securing step and the bag insures a uniform bond along the entire surface of engagement.

As before, according to one aspect of the invention, the skin member 28 may be procured either in a cured or uncured condition, and the traling edge wedge 32 may also be cured or uncured in its desired shape. In this case, the skin member 28, the spar heel 24, the machined core 26 and secured skin member 30 and the trailing edge wedge 32 are mutually attached using any known adhesive for the purpose. The adhesive is applied to the mating surfaces and the elements subjected to heat and pressure in the bonding assembly jig to secure the mating surfaces.

According to a preferred aspect of the invention, the skin member 28 and trailing edge wedge 32 are first layed-up in the jig portion 68, the machined core 26 and secured skin member 30 and spar heel 24 positioned as before, the jig assembled and the contents thereof subjected to the heat and pressure of a curing cycle. As a result of the curing, the layed-up skin member 28 and the layed-up trailing edge wedge 32 are formed into structural members and simultaneously all the engaged surfaces are secured.

In either case, however, the spar heel is separately fabricated. Preferably it is also formed by first being layed-up in mold and subjected to the heat and pressure of a curing cycle.

Where the aft fairing structure 14 is to include discrete boxes 34, the procedure is basically unchanged from that described above. The skin members 30 are placed in the jig portion side-by-side and secured to the bottom surface of their respective core and spacer rib. At the same time, the engaged side surfaces of the core and spacer rib of each box are secured while the other side surface of each spacer rib is secured to the side surface of the core of an adjacent box. Before this securing step is effected, the bottom surface of each core and spacer rib section is cut or machined to conform them to the inclination of the jig portion 62 for the reason stated above. Thereafter the fabrication of the aft fairing structure 14 proceeds as outlined above. Preferably, the skin members on both the top and bottom surfaces of the core and spacer ribs as well as the trailing edge wedge are layed-up and cured.

As an alternative to the above, it may be desirable in both configurations to first attach a simulated skin member to the bottom surface of the core or core and spacer rib after the core or core and spacer rib have been cut for the purpose of machining the top surface to the desired contoured surface. Thereafter, the simulated skin member is removed and the top and bottom skin members, spar heel, and if desired, the trailing edge wedge are secured in accordance with the teaching discussed above.

According to a preferred aspect of the invention, the skin members and trailing edge wedge are layed-up and formed into structural members by curing while all the engaged surfaces are simultaneously secured.

The simulated skin member may be any easily manageable material of appropriate thickness.

As another alternative to the above, it may be desirable to procure the core 26 with both surfaces 58 and 60 machined to their desired contour. In this case, according to one aspect of the invention, the aft fairing structure 14 is fabricated by placing the core 26, the skin members 28 and 30, the spar heel 24 and the trailing edge wedge 32 into assembly as shown in FIG. 4 and the engaged surfaced simultaneously secured using an adhesive and the requisite amount of heat and pressure.

According to a preferred aspect of the invention, the skin members and trailing edge wedge are layed-up in the assembly with the procured core and spar heel and formed into structural members by curing while all the engaged surfaces are simutaneously secured.

Figure 5:
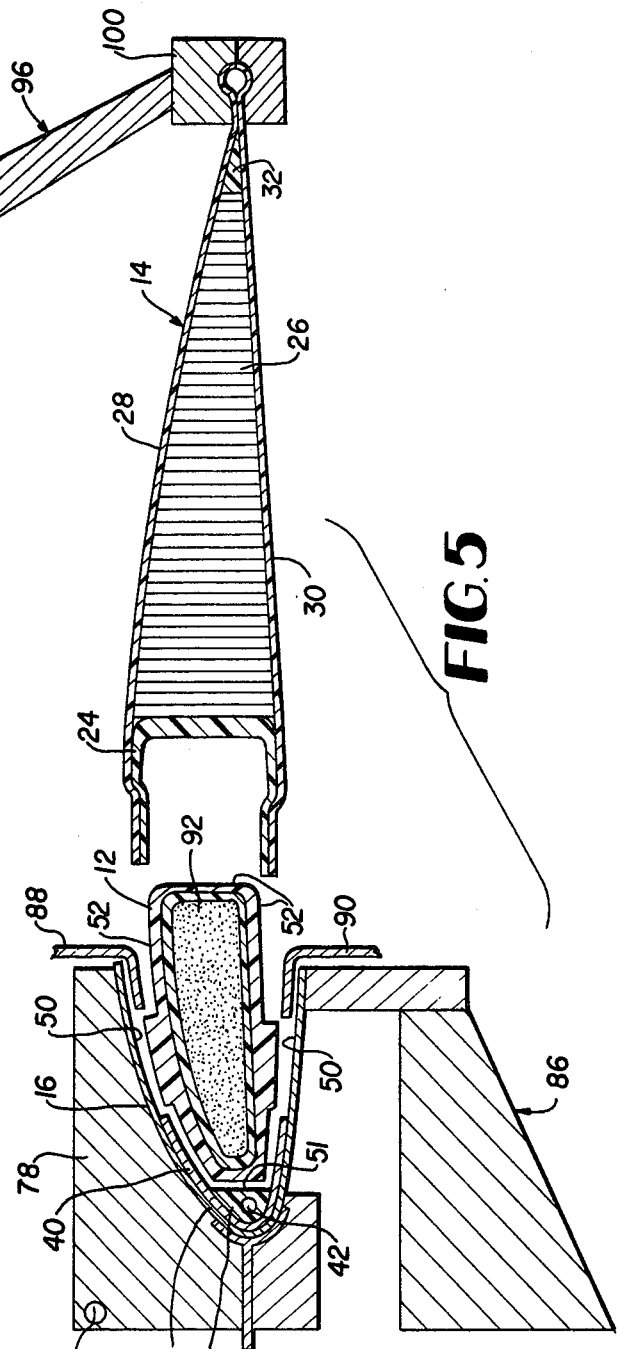

After the aft fairing structure 14 is fabricated it is assembled as shown in FIGS. 5–7 with the remaining parts of the rotor blade 10 in a single matched die mold 70,80,82.

The nose block 18, the spar 12 and the deicing blanket 40 can be preformed or procured members. These three members may be formed into a separate subassembly. Alternatively, the cap member 16, the deicing blanket 40 and the nose block 18; or the cap member 16 and deicing blanket 40; or the spar 12 and nose block 18 may be formed into separate subassemblies.

Preferably, however, the nose block 18 and spar 12 are layed-up in a fashion similar to that of the spar heel 24, the skin members 28 and 30 and the trailing edge wedge 32, and subjected to one final curing cycle in the sngle matched die mold at which time they are structuralized. The nose block 18 is layed-up directly in the cap member 16, while the spar 12 is layed-up on an inflatable and preferably rigidized mandrel 92 and placed into the cap member 16 in this state. In the nose block lay-up, the counterweight is included as a part thereof, while when the nose block is either preformed or procured, the counterweight is inserted into the bore 42 before the nose block is placed into the cap member 16.

The final assembly is made by placing any of the subassemblies of the nose block 18, the spar 12, the deicing blanket 40 and the cap member 16, mentioned above, into the forward section 78 of the single matched die mold and positioning them therein with the aid of the leading edge tooling tabs 84. When it is desired to use a metal or non-metallic cap member 16 with any subassembly other than that subassembly which includes the cap member 16, the deicing blanket 40, the nose block 18 and the spar 12, a spreading tool 86 having spreading tongs 88 and 90 is used. The tongs 88 and 90 cooperate to spread the cap member open sufficiently so that the nose block 18 and spar 12, or the nose block 18, deicing blanket 40 and spar 12 can be inserted in place within the cap member and so that the aft fairing structure with the spar heel 24 can be installed into engagement with the cap member and spar.

Once the blade is assembled and properly located in relation to the forward section 78 of the single matched die mold, the forward section 78 is pivoted about a pin 94 by appropriate means (not shown) through the position shown in FIG. 6 to the position shown in FIG. 7 where the aft fairing structure 14 and part of the spar are brought to rest in the aft section 80 of the single matched die mold. To partially support the assembled blade during the pivotal movement of the forward section 78, and to also properly locate the aft section 80, a locator support 96 and a strongback 97 are provided. The locator support 96 comprises an arm 98 and a two part receiver 100 which receives a terminal end of the joined skin members 28 and 30, and which can be locked together by means not shown. The arm 96 and receiver 100 are mutually pivotable.

The terminal end of the skin members is purposely shaped as shown in FIGS. 3–7 so that the blade can be safely pivoted with the forward section 78, and so that the aft fairing structure can be securely held between the two halves of the receiver 100 and supported during the assembly of the aft fairing structure shown in FIG. 5 with any of the subassemblies noted above. The means for bringing the aft fairing structure into the assembly shown in FIG. 5, except for the arm 98 and the receiver 100, is not shown since it is conventional.

The aft section 80 is provided with a matching recess 102 into which one half of the receiver 100 is inserted. The terminal end is eventually removed from the blade to form the blade trailing edge 76.

Prior to pivoting of the blade and forward section 78 the strongback 97 is secured in place between the forward section 78 and the receiver 100 (FIG. 7) in a conventional manner not shown.

With the blade assembled as shown in FIGS. 6 and 7, according to a preferred embodiment which includes only the aft fairing structure as a subassembly, the following surfaces are in engagement but unsecured: the spar engaging surface 51 of the nose block 18 is in engagement with the spar 12; the nose block engaging portion 46 of the cap member 16 is in engagement with the nose block 18 or with the deicing blanket 40 as the case may be; the spar engaging portion 48 of the cap member 16 is in engagement with the spar 12; the aft fairing skin member engaging portion 50 of the cap member 16 is in engagement with the aft fairing skin members 28 and 30; and the spar heel engaging portion 52 of the spar 12 is in engagement with the spar heel 24.

Referring to FIG. 7, the final assembly is completed by lowering the upper section 82 of the single matched die mold into its closed position and heat and pressure applied to the assembled blade. For this purpose the upper section 82 is connected to a press which is not shown.

Again according to one aspect of the invention, if the nose block 18, deicing blanket 40 and spar 12 are preformed or procured as structural members, then the above-noted engaged surfaces are attached by using any known adhesive for the purpose. The adhesive is applied to the engaged surfaces prior to their engagement and the surfaces thus engaged are secured by the heat and pressure applied to the assembly in the single matched die mold.

According to a preferred aspect of the invention, the nose block 18, deicing blanket 40 and spar 12 are layed-up as noted above and located in the single matched die mold. This subassembly along with the aft fairing structure subassembly is then subjected to the heat and pressure of a curing cycle, as a result of which the nose block 18, deicing blanket 40 and spar 12 are structuralized and the above-noted engaged surfaces simultaneously secured.

In laying-up the deicing blanket 40, for example, in the cap member 16, a layer or layers 104 of tape is appliedby an adhesive to the inner surface of the cap member (FIG. 8) with any known adhesive. To this tape layer or layers the grid 106 including the electrical wires 108 is attached also by an adhesive. Finally a further layer or layers 110 of tape is attached by an adhesive to the exposed surface of grid 106. The grid 106 may be a printed circuit board, if desired. The adhesive serves primarily to position the blanket in the cap member so that the nose block 18 can be layed-up directly in the cap member and thereafter the layed-up spar can also be inserted into the cap member and properly positioned. When properly positioned, a portion of the deicing blanket fills the slot 55 so hat, when viewed in cross-section, a continuous wall is established from the outside surface of the cap member to the inside surface of the spar. With such a continuous wall, an enhancement of the load carrying capability of the rotor blade is achieved because, for one thing, the supporting structural material of the deicing blanket itself becomes a load carrying member.

A continuous wall is also established between the outside surface of the cap member and the inside surface of the spar in the spar heel region of the assembly by that portion of the secured skin members and spar heel received within the recess 53 (FIG. 2). This design, which we refer to as the "tuck-in" design, is very effective in firmly securing the aft fairing structure into assembly with the spar and cap member, providing thereby a fail-safe design. It is also effective from the standpoint of load transfer into the aft fairing structure. The greater resulting load distribution increases the load carrying capacity of the rotor blade which itself is desirable.

As noted above, one feature of the present invention resides in the provision of an extended spar heel which together with the spar and cap member from the root end of the blade. A transition of the spar, the cap member and spar heel occurs so that at the root end, the spar and spar heel form, preferably, a rectangular cross-section. Since the spar is preferably formed as a layed-up structure which is cured in the single matched die mold, the extension of the spar heel beyond the aft fairing structure and to an extent equal to that of the spar insures that the spar is properly formed during the curing cycle.

As an example of certain of the operating parameters which are used in the manufacture of the composite rotor blade according to the present invention in which a lay-up configuration is employed, the following are noted:

1. A pre-impregnated mono-filament fiber is used for the lay-up members.
2. The aft fairing structure is cured at 250° F for two hours at approximately 50 to 100 PSI.
3. The spar heel is cured at 250° F for 2 hours at approximately 70 to 100 PSI.
4. In the single matched die mold the cure cycle is 2 hours at 250° F with a spar bag pressure of approximately 70 to 100 PSI. When utilizing a titanium cap member and a deicing blanket, an adhesive system requiring 250° F for 2 hours at approximately 70 to 100 PSI is needed for bonding the deicing blanket to the cap member.

From the foregoing description it can be seen that the objects of the invention as introduced above are achieved and a method according to which a composite structure such as a rotor blade can be fabricated at a much reduced cost than has heretofore been possible. In addition, the preferred method of this invention provides for additional reliability and safety over other known methods of fabrication by requiring that the spar be heated to cure temperature only once, and by enhancing the quality of bond formed at all secured surfaces due to the fact that the bonding is simultaneously achieved during curing. Moreover, it provides a fail safe attachment of the spar to the aft fairing skin members and eliminates close tolerance and difficult secondary bonds at critical interfaces.

We claim:

1. A method of fabricating a composite areodynamic rotor blade assembly utilizing a single method die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, with the top and bottom surfaces being contoured to a desired portion of an airfoil shape, and a skin member secured to each one of the top and bottom surfaces; and a tip cover having a surface which engages the cap member and the skin members, the method comprising the steps of:
   a. forming the aft fairing structure in a bonding assembly jig by:
      (i) attaching with an adhesive, a skin member to each of the top and bottom surfaces of the core;
      (ii) attaching with an adhesive, the spar heel to the front surface of the core and to each skin member; and
      (iii) securing the attached surfaces to each other by the application of heat and pressure to the bonding assembly jig;
   b. placing the spar, the cap member, the nose block, the aft fairing structure and the tip cover into the single matched die mold with:
      (i) the nose block engaging portion, the spar engaging portion and the aft fairing skin member engaging portion of the inner surface of the cap member in engagement with the nose block, the spar and the aft fairing skin members, respectively;
      (ii) the spar engaging surface of the nose block engaging the spar;
      (iii) the spar heel engaging portion of the outer surface of the spar engaging the spar heel;
      (iv) the tip cover surface engaging the cap member and the skin members; and with
      (v) the engaged surfaces in (i) – (iv) being attached with an adhesive; and
   (c) securing the attached surfaces to each other in the single matched die mold through the application of heat and pressure to thereby form the composite aerodynamic rotor blade assembly.

2. The method as defined in claim 1, wherein the assembly further includes a trailing edge wedge, and wherein during the formation of the aft fairing structure the trailing edge wedge is attached with an adhesive to the rear surface of the core and to both skin members and subsequently secured to the attached surfaces during the application of heat and pressure to the bonding assembly jig.

3. The method as defined in claim 1, wherein the assembly further includes a deicing blanket, wherein during the placement defined in step b) the deicing blanket is placed between the cap member and the nose block and spar and attached thereto with an adhesive, and wherein during the securing step defined in step c) the deicing blanket is secured at its attached surfaces to the cap member, the nose block and the spar.

4. The method as defined in claim 1, further comprising the step of:
   d. laying-up the spar heel in a mold and forming the spar heel into a structural member by subjecting it to the heat and pressure of a curing cycle.

5. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a plurality of box sections each having a lightweight core and a spacer rib each with front, rear, top, bottom and side surfaces, with the top and bottom surfaces being contoured to a desired portion of an airfoil shape, and a skin member secured to both top surfaces and to both bottom surfaces; and a tip cover having a surface which engages the cap member and the skin members, the method comprising the steps of:

a. forming the aft fairing structure in a bonding assembly jig by:
   (i) attaching with an adhesive, a skin member to each of the top and bottom surfaces of the core and corresponding spacer rib of each box section;
   (ii) attaching with an adhesive, one of the side surfaces of each spacer rib to the side surface of the core of its box section and the other of the side surfaces of each spacer rib to the side surface of an adjacent core;
   (iii) attaching with an adhesive, the spar heel to the front surface of each core and spacer rib and to each skin member; and
   (iv) securing the attached surfaces to each other by the application of heat and pressure to the bonding assembly jig.
b. placing the spar, the cap member, the nose block, the aft fairing structure and the tip cover into the single matched die mold with:
   (i) the nose block engaging portion, the spar engaging portion and the aft fairing skin member engaging portion of the inner surface of the cap member in engagement with the nose block, the spar and the aft fairing skin members, respectively;
   (ii) the spar engaging surface of the nose block engaging the spar;
   (iii) the spar heel engaging portion of the outer surface of the spar engaging the spar heel;
   (iv) the tip cover surface engaging the cap member and the skin members; and with
   (v) the engaged surfaces in (i) – (iv) being attached with an adhesive; and
c. securing the attached surfaces to each other in the single matched die mold through the application of heat and pressure to thereby form the composite aerodynamic rotor blade assembly.

6. The method as defined in claim 5, wherein the assembly further includes a trailing edge wedge, and wherein during the formation of the aft fairing structure the trailing edge wedge is attached with an adhesive to the rear surface of each core and spacer rib and to the skin members of each box section and subsequently secured to the attached surfaces during the application of heat and pressure to the bonding assembly jig.

7. The method as defined in claim 5, wherein the assembly further includes a deicing blanket, wherein during the placement defined in step b) the deicing blanket is placed between the cap member and the nose block and spar and attached thereto with an adhesive, and wherein during the securing step defined in step c) the deicing blanket is secured at its attached surfaces to the cap member, the nose block and the spar.

8. The method as defined in claim 5, further comprising the step of:
   d. laying-up the spar heel in a mold and forming the spar heel into a structural member by subjecting it to the heat and pressure of a curing cycle.

9. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface, a spar heel; a spar having a root end and an outer surface with a spar heel engaging portion; an aft fairing structure which defines a trailing edge of the blade and comprises a lightweight core having front, rear, top and bottom surfaces, with the top and bottom surfaces being contoured to a desired portion of an airfoil shape, and a skin member secured to each one of the top and bottom surfaces; and a tip cover having a surface which engages the cap member and the skin members, the method comprising the steps of:
   a. forming the aft fairing structure in a bonding assembly jig by:
      (i) laying-up one of the skin members in the jig and engaging the layed-up skin member with the bottom surface of the core;
      (ii) laying-up the other of the skin members in the jig in engagement with the top surface of the core;
      (iii) engaging the spar heel with each layed-up skin member and attaching with an adhesive the spar heel to the front surface of the core; and
      (iv) forming the layed-up skin members into structural members by subjecting them to the heat and pressure of a curing cycle while at the same time securing all the engaged, and attached surfaces;
   b. placing the spar, the cap member, the nose block, the aft fairing structure and the tip cover into the single matched die mold with:
      (i) the nose block engaging portion, the spar engaging portion and the aft fairing skin member engaging portion of the inner surface of the cap member in engagement with the nose block, the spar and the aft fairing skin members, respectively;
      (ii) the spar engaging surface of the nose block engaging the spar;
      (iii) the spar heel engaging portion of the outer surface of the spar engaging the spar heel;
      (iv) the tip cover surface engaging the cap member and the skin members; and with
      (v) the engaged surfaces in (i) – (iv) being attached with an adhesive; and
   c. securing the attached surfaces to each other in the single matched die mold through the application of heat and pressure to thereby form the composite aerodynamic rotor blade assembly.

10. The method as defined in claim 9, wherein the assembly further includes a trailing edge wedge, and wherein during the formation of the aft fairing structure the trailing edge wedge is engaged with both layed-up skin members and attached with an adhesive to the rear surface of the core and subsequently secured to the engaged and attached surfaces during the curing cycle.

11. The method as defined in claim 9, wherein the assembly further includes a trailing edge wedge, the method further comprises the step of:
   d. laying-up the trailing edge wedge in the jig in engagement with both layed-up skin members and with the rear surface of the core, and wherein the layed-up trailing edge wedge is formed into a structural member and secured to its engaged surfaces during the curing cycle.

12. The method as defined in claim 9, wherein the assembly further includes a deicing blanket, wherein during the placement defined in step b) the deicing blanket is placed between the cap member and the nose block and spar and attached thereto with an adhesive, and wherein during the securing step defined in step c)

the deicing blanket is secured at its attached surfaces to the cap member, the nose block and the spar.

13. The method as defined in claim 9, further comprising the step of:
   d. laying-up the spar heel in a mold and forming the spar heel into a structural member by subjecting it to the heat and pressure of a curing cycle.

14. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a plurality of box sections each having a lightweight core and a spacer rib each with front, rear, top, bottom and side surfaces, with the top and bottom surfaces being contoured to a desired portion of an airfoil shape, and a skin member secured to both top surfaces and to both bottom surfaces; and a tip cover having a surface which engages the cap member and the skin members, the method comprising the steps of:
   a. forming the aft fairing structure in a bonding assembly jig by:
      (i) laying-up, for each box section, one of the skin members in the jig and engaging the layed-up skin member with the bottom surface of the core and corresponding spacer rib of the respective box section;
      (ii) attaching with an adhesive one of the side surfaces of each spacer rib to the side surface of the core of its box section and the other of the side surfaces of each spacer rib to the side surface of an adjacent core;
      (iii) laying-up, for each box section, the other of the skin members in the jig in engagement with the top surface of a core and corresponding spacer rib of the respective box section;
      (iv) engaging the spar heel with each layed-up skin member and attaching with an adhesive the spar heel to the front surface of each core and spacer rib; and
      (v) forming the layed-up skin members into structural members by subjecting them to the heat and pressure of a curing cycle while at the same time securing all the engaged and attached surfaces;
   b. placing the spar, the cap member, the nose block, the aft fairing structure and the tip cover into the single matched die mold with:
      (i) the nose block engaging portion, the spar engaging portion and the aft fairing skin member engaging portion of the inner surface of the cap member in engagement with the nose block, the spar and the aft fairing skin members, respectively;
      (ii) the spar engaging surface of the nose block engaging the spar;
      (iii) the spar heel engaging portion of the outer surface of the spar engaging the spar heel;
      (iv) the tip cover surface engaging the cap member and the skin members; and with
      (v) the engaged surfaces in (i) – (iv) being attached with an adhesive; and
   c. securing the attached surfaces to each other in the single matched die mold through the application of heat and pressure to thereby form the composite aerodynamic rotor blade assembly.

15. The method as defined in claim 14, wherein the assembly further includes a trailing edge wedge, and wherein during the formation of the aft fairing structure the trailing edge wedge is engaged with both layed-up skin members and attached with an adhesive to the rear surface of the core and spacer of each box section and subsequently secured to the engaged and attached surfaces during the curing cycle.

16. The method as defined in claim 14, wherein the assembly further includes a trailing edge wedge, the method further comprises the step of:
   d. laying-up the trailing edge wedge in the jig in engagement with both layed-up skin members and with the rear surface of the core and spacer of each box section, and wherein the layed-up trailing edge wedge is formed into a structural member and secured to its engaged surfaces during the curing cycle.

17. The method as defined in claim 14, wherein the assembly further includes a deicing blanket, wherein during the placement defined in step b) the deicing blanket is placed between the cap member and the nose block and spar and attached thereto with an adhesive, and wherein during the securing step defined in step c) the deicing blanket is secured at its attached surfaces to the cap member, the nose block and the spar.

18. The method as defined in claim 14, further comprising the step of:
   d. laying-up the spar heel in a mold and forming the spar heel into a structural member by subjecting it to the heat and pressure of a curing cycle.

19. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, a skin member secured to each one of the top and bottom surfaces, and a tip cover having a surface which engages the cap member and the skin members, the method comprising steps of:
   a. machining the bottom surface of the core at an inclination relative to the top surface of the core such that the core cells assume a vertical orientation when the core is placed in a bonding assembly jig;
   b. forming the aft fairing structure in a bonding assembly jig by:
      (i) attaching with an adhesive, one of the skin members to the machined bottom surface of the core;
      (ii) machining the top surface of the core into a contoured surface;
      (iii) attaching with an adhesive, the other skin member to the machined top surface of the core;
      (iv) attaching with an adhesive, the spar heel to the front surface of the core and to each skin member; and (v) securing the attached surfaces to each other by the application of heat and pressure to the bonding assembly jig;

c. placing the spar, the cap member, the nose block, the aft fairing structure and the tip cover into the single matched die mold with:
   (i) the nose block engaging portion, the spar engaging portion and the aft fairing skin member engaging portion of the inner surface of the cap member in engagement with the nose block, the spar and the aft fairing skin members, respectively;
   (ii) the spar engaging surface of the nose block engaging the spar;
   (iii) the spar heel engaging portion of the outer surface of the spar engaging the spar heel; and
   (iv) the tip cover surface engaging the cap member and the skin members; and with
   (v) the engaged surfaces in (i) – (iv) being attached with an adhesive; and d. securing the attached surfaces in the single matched die mold through the application of heat and pressure to thereby form the composite aerodynamic rotor blade assembly.

20. The method as defined in claim 19, wherein the assembly further includes a trailing edge wedge, and wherein during the formation of the aft fairing structure and trailing edge wedge is attached with an adhesive to the rear surface of the core and to both skin members and subsequently secured to the attached surfaces during the application of heat and pressure to the bonding assembly jig.

21. The method as defined in claim 19, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

22. The method as defined in claim 19, further comprising the step of:
   d. laying-up the spar heel in a mold and forming the spar heel into a structural member by subjecting it to the heat and pressure of a curing cycle.

23. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a plurality of box sections each having a lightweight core and a spacer rib each with front, rear, top, bottom and side surfaces, and a skin member secured to both top surfaces and to both bottom surfaces; and a tip cover having a surface which engages the cap member and the skin members, the method comprising the steps of:
   a. machining the bottom surface of the core and spacer rib of each box section at an inclination relative to the top surface of the core and spacer rib such that the core cells assume a vertical orientation when the core is placed in a bonding assembly jig;

b. forming the aft fairing structure in a bonding assembly jig by:
   (i) attaching with an adhesive, a skin member to the machined bottom surfaces of the core and corresponding spacer rib of each box section;
   (ii) attaching with an adhesive, one of the side surfaces of each spacer rib to the side surface of the core of its box section and the other of the side surfaces of each spacer rib to the side surface of an adjacent core;
   (iii) machining the top surface of each core and corresponding spacer rib into a contoured surface;
   (iv) attaching with an adhesive, a skin member to the machined top surfaces of the core and corresponding spacer rib of each box section;
   (v) attaching with an adhesive, the spar heel to the front surfaces of the core and spacer rib of each box section and to the skin members; and
   (vi) securing the attached surfaces to each other by the application of heat and pressure to the bonding assembly jig;

c) placing the spar, the cap member, the nose block, the aft fairing structure and the tip cover into the single matched die mold with:
   (i) the nose block engaging portion, the spar engaging portion and the aft fairing skin member engaging portion of the inner surface of the cap member in engagement with the nose block, the spar and the aft fairing skin members, respectively;
   (ii) the spar engaging surface of the nose block engaging the spar;
   (iii) the spar heel engaging portion of the outer surface of the spar engaging the spar heel;
   (iv) the tip cover surface engaging the cap member and the skin members; and with
   (v) the engaged surfaces in (i) – (iv) being attached with an adhesive; and d. securing the attached surfaces to each other in the single matched die mold through the application of heat and pressure to thereby form the composite aerodynamic rotor blade assembly.

24. The method as defined in claim 23, wherein the assembly further includes a trailing edge wedge, and wherein during the formation of the aft fairing structure the trailing edge wedge is attached with an adhesive to the rear surface of each core and spacer rib and to the skin members of each box section, and subsequently secured to the attached surfaces during the application of heat and pressure to the bonding assembly jig.

25. The method as defined in claim 23, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

26. The method as defined in claim 23, further comprising the step of:
   d. laying-up the spar heel in a mold and forming the spar heel into a structural member by subjecting it to the heat and pressure of a curing cycle.

27. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, and a skin member secured to each one of the top and bottom surfaces; and a tip cover having a surface which engages the cap member and the skin members, the method comprising the steps of:

a. machining the bottom surface of the core at an inclination relative to the top surface of the core such that the core cells assume a vertical orientation when the core is placed in a bonding assembly jig;

b. forming the aft fairing structure in a bonding assembly jig by:

(i) laying-up one of the skin members in the jig and engaging the layed-up skin member with the bottom surface of the core;

(ii) forming the layed-up skin member into a structural member by subjecting it to the heat and pressure of a curing cycle while at the same time securing it to the engaged surface of the core;

(iii) machining the top surface of the core into a contoured surface;

(iv) laying-up the other of the skin member in a jig and in engagement with the machined contoured top surface of the core;

(v) attaching with an adhesive, the spar heel to the front surface of the core and to the structuralized skin member while engaging the spar heel with the layed-up skin member; and (vi) forming the layed-up skin member into a structural member by subjecting it to the heat and pressure of a curing cycle while at the same time securing the engaged and attached surfaces.

c. placing the spar, the cap member, the nose block, the aft fairing structure and the tip cover into the single matched die mold with:

(i) the nose block engaging portion, the spar engaging portion and the aft fairing skin member engaging portion of the inner surface of the cap member in engagement with the nose block, the spar and the aft fairing skin members, respectively;

(ii) the spar engaging surface of the nose block engaging the spar;

(iii) the spar heel engaging portion of the outer surface of the spar engaging the spar heel;

(iv) the tip cover surface engaging the cap member and the skin members; and with (v) the engaged surfaces in (i) – (iv) being attached with an adhesive; and d. securing the attached surfaces to each other in the single matched die mold through the application of heat and pressure to thereby form the composite aerodynamic rotor blade assembly.

28. The method as defined in claim 27, wherein the assembly further includes a trailing edge wedge, and wherein during the formation of the aft fairing structure the trailing edge wedge is engaged with the layed-up skin member and attached with an adhesive to the rear surface of the core and to the structuralized skin member, and subsequently secured to the engaged and attached surfaces during the curing cycle of the layed-up skin member.

29. The method as defined in claim 27, wherein the assembly further includes a trailing edge wedge, the method further comprises the step of:

e. laying-up the trailing edge wedge in the jig in engagement with the structuralized skin member, the layed-up skin member and the rear surface of the core, and wherein the layed-up trailing edge wedge is formed into a structural member and secured to its engaged surfaces during the curing cycle of the layed-up skin member.

30. The method as defined in claim 27, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

31. The method as defined in claim 27, further comprising the step of:

e. laying-up the spar heel in a mold and forming the spar heel into a structural member by subjecting it to the heat and pressure of a curing cycle.

32. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion, and an aft fairing skin member engaging portion; a nose block having a spar engaging surface; a spar heel; a spar having a root end and an outer surface with a space heel engaging portion; an aft fairing structure which defines a trailing edge of the blade and comprises a plurality of box sections each having a lightweight core and a spacer rib each with front, rear, top, bottom and side surfaces, and a skin member secured to both top surfaces and to both bottom surfaces; and a tip cover having a surface which engages the cap member and the skin members, the method comprising the steps of:

a. machining the bottom surface of the core and spacer rib of each box section at an inclination relative to the top surface of the core and spacer rib such that the core cells assume a vertical orientation when the core is placed in a bonding assembly jig;

b. forming the aft fairing structure in a bonding assembly jig by:

(i) laying-up, for each box section, one of the skin members in the jig and engaging the layed-up skin member with the bottom surface of the core and corresponding spacer rib of the respective box section;

(ii) attaching with an adhesive, one of the side surfaces of each spacer rib to the side surface of the core of its box section and the other of the side surfaces of each spacer rib to the side surface of an adjacent core;

(iii) forming the layed-up skin member for each box section into a structural member by subjecting it to the heat and pressure of a curing cycle while at the same time securing the engaged and attached surfaces;

(iv) machining the top surface of each core and corresponding spacer rib into a contoured surface;

(v) laying-up, for each box section, the other of the skin members in a jig and in engagement with the machined contoured top surfaces of its associated core and spacer rib;

(vi) attaching with an adhesive, the spar heel to the front surface of each core and corresponding spacer rib and to the structuralized skin members while engaging the spar heel with the layed-up skin member; and (vii) forming the layed-up skin members into structural members by subjecting them to the heat and pressure of a curing cycle while at the same time securing the engaged and attached surfaces;

c. placing the spar, the cap member, the nose block, the aft fairing structure and the tip cover into the single matched die mold with:
  (i) the nose block engaging portion, the spar engaging portion and the aft fairing skin member engaging portion of the inner surface of the cap member in engagement with the nose block, the spar and the aft fairing skin members, respectively;
  (ii) the spar engaging surface of the nose block engaging the spar;
  (iii) the spar heel engaging portion of the outer surface of the spar engaging the spar heel; and
  (iv) the tip cover surface engaging the cap member and the skin members; and with
  (v) the engaged surfaces in (i) –(iv) being attached with an adhesive; and d. securing the attached surfaces in the single matched die mold through the application of heat and pressure to thereby form the composite aerodynamic rotor blade assembly.

33. The method as defined in claim 32, wherein the assembly further includes a trailing edge wedge, and wherein during the formation of the aft fairing structure the trailing edge wedge is engaged with the layed-up skin members and attached with an adhesive to the rear surface of each core and corresponding spacer rib and to the structuralized skin members, and subsequently secured to the engaged and attached surfaces during the curing cycle of the layed-up skin members.

34. The method as defined in claim 32, wherein the assembly further includes a trailing edge wedge, the method further comprises the step of:
e. laying-up the trailing edge wedge in the jig in engagement with the structuralized skin members, the layed-up skin members and the rear surface of each core and corresponding spacer rib, and wherein the layed-up trailing edge wedge is formed into a structural member and secured to its engaged surfaces during the curing cycle of the layed-up skin members.

35. The method as defined in claim 32, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

36. The method as defined in claim 32, further comprising the step of:
e. laying-up the spar heel in a mold and forming the spar heel into a structural member by subjecting it to the heat and pressure of a curing cycle.

37. A method of fabricating a composite aerodynamic rotor blade assembly utilizing a single matched die mold, the assembly including: a cpa member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, a skin member secured to each one of the top and bottom surfaces, and a tip cover having a surface which engages the cap member and the skin members, the method comprising steps of:

a. machining the bottom surface of the core at an inclination relative to the top surface of the core such that the core cells assume a vertical orientation when the core is placed in a bonding assembly jig;

b. forming the aft fairing structure in a bonding assembly jig by:
  (i) attaching a simulated skin member to the machined bottom surface of the core;
  (ii) machining the top surface of the core into a contoured surface;
  (iii) removing the simulated skin member;
  (iv) attaching with an adhesive, a skin member to each of the machined top and bottom surfaces of the core;
  (v) attaching with an adhesive the spar heel to the front surface of the core and to each skin member; and
  (vi) securing the attached surfaces to each other by the application of heat and pressure to the bonding assembly jig;

c. placing the spar, the cap member, the nose block, the aft fairing structure and the tip cover into the single matched die mold with:
  (i) the nose block engaging portion, the spar engaging portion and the aft fairing skin member engaging portion of the inner surface of the cap member in engagement with the nose block, the spar and the aft fairing skin members, respectively;
  (ii) the spar engaging surface of the nose block engaging the spar;
  (iii) the spar heel engaging portion of the outer surface of the spar engaging the spar heel; and
  (iv) the tip cover surface engaging the cap member and the skin members; and with
  (v) the engaged surfaces in (i) – (iv) being attached with an adhesive; and d. securing the attached surfaces in the single matched die mold through the application of heat and pressure to thereby form the composite aerodynamic rotor blade assembly.

38. The method as defined in claim 37, wherein the assembly further includes a trailing edge wedge, and wherein during the formation of the aft fairing structure the trailing edge wedge is attached with an adhesive to the rear surface of the core and to both skin members and subsequently secured to the attached surfaces during the application of heat and pressure to the bonding assembly jig.

39. The method as defined in claim 37, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

40. The method as defined in claim 37, further comprising the step of:
 d. laying-up the spar heel in a mold and forming the spar heel into a structural member by subjecting it to the heat and pressure of a curing cycle.

41. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a plurality of box sections each having a lightweight core and a spacer rib each with front, rear, top, bottom and side surfaces, and a skin member secured to both top surfaces and to both bottom surfaces; and a tip cover having a surface which engages the cap member and the skin members, the method comprising the steps of:
 a. machining the bottom surface of the core and spacer rib of each box section at an inclination relative to the top surface of the core and spacer rib such that the core cells assume a vertical orientation when the core is placed in a bonding assembly jig:
 b. forming the aft fairing structure in a bonding assembly jig by:
  (i) attaching a simulated skin member to the machined bottom surfaces of the core and corresponding spacer rib of each box section;
  (ii) attaching with an adhesive, one of the side surfaces of each spacer rib to the side surface of the core of its box section and the other of the side surfaces of each spacer rib to the side surface of an adjacent core;
  (iii) machining the top surface of each core and corresponding spacer rib into a contoured surface;
  (iv) removing the simulated skin member;
  (v) attaching with an adhesive, a skin member to each of the machined top and bottom surfaces of the core and corresponding spacer rib of each box section;
  (vi) attaching with an adhesive, the spar heel to the front surfaces of the core and spacer rib of each box section and to the skin members; and
  (vii) securing the attached surfaces to each other by the application of heat and pressure to the bonding assembly jig;
 c. placing the spar, the cap member, the nose block, the aft fairing structure and the tip cover into the single matched die mold with:
  (i) the nose block engaging portion, the spar engaging portion of the inner surface of the cap member in engagement with the nose block, the spar and the aft fairing skin members, respectively;
  (ii) the spar engaging surface of the nose block engaging the spar;
  (iii) the spar heel engaging portion of the outer surface of the spar engaging the spar heel;
  (iv) the tip cover surface engaging the cap member and the skin members; and with
  (v) the engaged surfaces in (1) – (iv) being attached with an adhesive; and
 d. securing the attached surfaces to each other in the single matched die mold through the application of heat and pressure to thereby form the composite aerodynamic rotor blade assembly.

42. The method as defined in claim 41, wherein the assembly further includes a trailing edge wedge, and wherein during the formation of the aft fairing structure the trailing edge wedge is attached with an adhesive to the rear surface of each core and spacer rib and to the skin members of each box section, and subsequently secured to the attached surfaces during the application of heat and pressure to the bonding assembly jig.

43. The method as defined in claim 41, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

44. The method as defined in claim 41, further comprising the step of:
 d. laying-up the spar heel in a mold and forming the spar heel into a structural member by subjecting it to the heat and pressure of a curing cycle.

45. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, and a skin member secured to each one of the top and bottom surfaces; and a tip cover having a surface which engages the cap member and the skin members, the method comprising the steps of:
 a. machining the bottom surface of the core at an inclination relative to the top surface of the core such that the core cells assume a vertical orientation when the core is placed in a bonding assembly jig;
 b. forming the aft fairing structure in a bonding assembly jig by:
  (i) attaching a simulated skin member to the machined bottom surface of the core;
  (ii) machining the top surface of the core into a contoured surface;
  (iii) removing the simulated skin member;
  (iv) laying-up one of the skin members in the jig and engaging the layed-up skin member with the bottomm surface of the core;
  (v) laying-up the other of the skin members in the jig in engagement with the machined contoured top surface of the core;
  (vi) attaching with an adhesive, the spar heel to the front surface of the core and engaging the spar heel with the layer-up skin members; and (viii) forming the layed-up skin members into structural members by subjecting them to the heat and pressure of a curing cycle while at the same time securing the engaged and attached surfaces c. placing the spar, the cap member, the nose block, the aft fairing structure and the tip cover into the single matched die mold with:
   (i) the nose block engaging portion, the spar engaging portion and the aft fairing skin member engaging portion of the inner surface of the cap member in engagement with the nose block, the spar and the aft fairing skin members, respectively;
   (ii) the spar engaging surface of the nose block engaging the spar;
   (iii) the spar heel engaging portion of the outer surface of the spar engaging the spar heel;
   (iv) the tip cover surface engaging the cap member and the skin members; and with
   (v) the engaged surfaces in (i) – (iv) being attached with an adhesive; and d. securing the attached surfaces to each other in the single matched die mold through the application of heat and pressure to thereby form the composite aerodynamic rotor blade assembly.

46. The method as defined in claim 45, wherein the assembly further includes a trailing edge wedge, and wherein during the formation of the aft fairing structure the trailing edge wedge is engaged with the layered-up skin member and attached with an adhesive to the rear surface of the core and to the structuralized skin member, and subsequently secured to the engaged and attached surfaces during the curing cycle of the layered-up skin member.

47. The method as defined in claim 45, wherein the assembly further includes a trailing edge wedge, the method further comprises the step of:

e. laying-up the trailing edge wedge in the jig in engagement with the structuralized skin member, the layed-up skin member and the rear surface of the core, and whereing the layed-up trailing edge wedge is formed into a structural member and secured to its engaged surfaces during the curing cycle of the layed-up skin member.

48. The method as defined in claim 45, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

49. The method as defined in claim 45, further comprising the step of:

e. laying-up the spar heel in a mold and forming the spar heel into a structural member by subjecting it to the heat and pressure of a curing cycle.

50. A method of fabricating a composite aeroodynamic rotor blade assembly utilizing a single matched die mold, the assembly including: a cap member having an outer surface which defines a leading edge of the blade and an inner surface with a nose block engaging portion, a spar engaging portion, and an aft fairing skin member engaging portion; a nose block having a spar engaging surface; a spar heel; a spar having a root end and an outer surface with a space heel engaging portion; an aft fairing structure which defines a trailing edge of the blade and comprises a plurality of box sections each having a lightweight core and a spacer rib each with front, rear, top, bottom and side surfaces, and a skin member secured to both top surfaces and to both bottom surfaces; and a tip cover having a surface which engages the cap member and the skin members, the method comprising the steps of:

a. machinging the bottom surface of the core and spacer rib of each box section at an inclination relative to the top surface of the core and spacer rib such that the core cells assume a vertical orientation when the core is placed in a bonding assembly jig;

b. forming the aft fairing structure in a bonding assembly jig by:
   (i) attaching, for each box section, a simulated skin member to the machined bottom surface of the core and corresponding spacer rib of the respective box section;
   (ii) attaching with an adhesive, one of the side surfaces of each spacer rib to the side surface of the core of its box section and the other of the side surfaces of each spacer rib to the side surface of an adjacent core;
   (iii) machining the top surface of each core and corresponding spacer rib into a contoured surface;
   (iv) removing the simulated skin member from each box section;
   (v) laying-up, for each box section, one of the skin members in the jig and engaging the layered-up skin member with the bottom surface of the core and corresponding spacer rib of the respective box section;
   (vi) laying-up, for each box section, the other of the skin members in a jig and in engagement with the machined contoured top surfaces of its associated core and spacer rib;
   (vii) attaching with an adhesive, the spar heel to the front surface of each core and corresponding spacer rib and engaging the spar heel with each layered-up skin member; and
   (viii) forming the layed-up skin members into structural members by subjecting them to the heat and pressure of a curing cycle while at the same time securing the engaged and attached surfaces;

c. placing the spar, the cap member, the nose block, the aft fairing structure and the tip cover into the single matched die mold with:
   (i) the nose block engaging portion, the spar engaging portion and the aft fairing skin member engaging portion of the inner surface of the cap member in engagement with the nose block, the spar and the aft fairing skin members, respectively;
   (ii) the spar engaging surface of the nose block engaging the spar;
   (iii) the spar heel engaging portion of the outer surface of the spar engaging the spar heel; and
   (vi) the tip cover surface engaging the cap member and the skin members; and with
   (v) the engaged surfaces in (i) – (iv) being attached with an adhesive; and d. securing the attached surfaces in the single matched die mold through the application of heat and pressure to thereby form the composite aerodynamic rotor blade assembly.

51. The method as defined in claim 50, wherein the assembly further includes a trailing edge wedge, and wherein during the formation of the aft fairing structure the trailing edge wedge is engaged with the layed-up skin members and attached with an adhesive to the rear surface of each core and corresponding spacer rib and to the structuralized skin members, and subsequently secured to the engaged and attached surfaces during the curing cycle of the layed-up skin members.

52. The method as defined in claim 50, wherein the assembly further includes a trailing edge wedge, the method further comprises the step of:
  e. laying-up the trailing edge wedge in the jig in engagement with the structualized skin members, the layed-up skin members and the rear surface of each core and corresponding spacer rib, and wherein the layed-up trailing edge wedge is formed into a structural member and secured to its engaged surfaces during the curing cycle of the layed-up skin members.

53. The method as defined in claim 50, wherein the assembly further includes a deicing blanket, wherein during the placement defined in step c) the deicing blanket is placed between the cap member and the nose block and spar and attached thereto with an adhesive, and wherein during the securing step defined in step d) the deicing blanket is secured at its attached surfaces to the cap member, the nose block and the spar.

54. The method as defined in claim 50, further comprising the step of:
  e. laying-up the spar heel in a mold and forming the spar heel into a structural member by subjecting it to the heat and pressure of a curing cycle.

55. A method of fabricating a composite aerodynamic rotor blade assembly utilizing a single matched die mold, the assembly including; a cap member having an outer surface which defines a leading edge of the blade and an inner surface with a nose block engaging portion, a spar engaging portion and an aft fairing skin member engaging portion; a nose block having a spar engaging surface a spar heel; a spar having a root end and an outer surface with a spar heel engaging portion; an aft fairing structure which defines a trailing edge of the blade and comprises a lightweight core having front, rear, top and bottom surfaces, and a skin member secured to each one of the top and bottom surfaces; and a tip cover having a surface which engages the cap member and the skin members, the method comprising the steps of:
  a. forming the aft fairing structure in a bonding assembly jig as a subassembly including a lightweight core having front, rear, top and bottom surfaces, a skin member secured to each one of the top and bottom surfaces and a spar heel secured to the front surface of the core and to each skin member;
  b. laying-up the spar in the single matched die mold;
  c. placing the cap member, the nose block, the aft fairing structure and the tip cover into the single matched die mold with:
    (i) the nose block engaging portion and the aft fairing skin member engaging portion of the cap member being attached with an adhesive to the nose block and the aft fairing skin members, while the spar engaging portion of the cap member is engaged with the layed-up spar;
    (ii) the spar-engaging surface of the nose block engaging the layed-up spar;
    (iii) the spar heel engaging portion of the outer surface of the layed-up spar engaging the spar heel; and
    (iv) the tip cover surface engaging the cap member and the skin members; and
  d. forming the layed-up spar into a structural member while securing the engaged and attached surface to thereby form the composite aerodynamic rotor blade assembly.

56. The method as defined in claim 55, wherein the aft fairing structure further includes a trailing edge wedge secured, during the formation of the aft fairing structure to the rear surface of the core and to each skin member.

57. The method as defined in claim 55, wherin the assembly further includes a deicing blanket, wherein during the placement defined in step c) the deicing blanket is placed between the cap and the nose block and layed-up spar and attached to the cap member and nose block with an adhesive while engaging the layed-up spar, and wherein during step d) the deicing blanket is secured to its engaged and attached surfaces.

58. The method as defined in claim 55, further comprising the step of:
  e. laying-up the spar heel in a mold and forming the spar heel into a structural member by subjecting it to the heat and pressure of a curing cycle.

59. A method of fabricating a composite aerodynamic rotor blade assembly utilizing a single matched die mold, the assembly including: a cap member having an outer surface with defines a leading edge of the blade and an inner surface with a nose block engaging portion, a spar engaging portion and an aft fairing skin member engaging portion; a nose block having a spar engaging surface; a spar heel; a spar having a root end and an outer surface with a spar heel engaging portion; an aft fairing structure which defines a trailing edge of the blade and comprises a lightweight core having front, rear, top and bottom surfaces, and a skin member secured to each one of the top and bottom surfaces; and a tip cover having a surface which engages the cap member and the skin members, the method comprising the steps of:
  a. forming the aft fairing structure in a bonding assembly jig as a subassembly including a lightweight core having front, rear, top and bottom surfaces, a skin member secured to each one of the top and bottom surfaces and a spar heel secured to the front surface of the core and to each skin member;
  b. laying-up the nose block in the cap member;
  c. placing the cap member with the layed-up nose block, the spar, the aft fairing structure and the tip cover into the single matched die mold with:
    (i) the spar engaging portion and the aft fairing skin member engaging portion of the cap member being attached with an adhesive to the spar and the aft fairing skin members, while the nose block engaging portion of the cap member is engaged with the layed-up nose block;
    (ii) the spar engaging surface of the layed-up nose block engaging the spar;
    (iii) the spar heel engaging portion of the outer surface of the spar engaging the spar heel; and
    (iv) the tip cover surface engaging the cap member and the skin members; and
  d. forming the layed-up nose block into a structural member while the engaged and attached surfaces to thereby form the composite aerodynamic rotor blade assembly.

60. The method as defined in claim 59, wherein the aft fairing structure further includes a trailing edge wedge secured, during the formation of the aft fairing structure to the rear surface of the core and to each skin member.

61. The method as defined in claim 59, wherein the assembly further includes a deicing blanket, wherein the deicing blanket is placed between the cap member and the layed-up nose block and attached to the cap member with an adhesive, while engaging the layed-up nose block, wherein during the placement defined in step c) the deicing blanket is attached with an adhesive to the spar, and wherein during step d) the deicing blanket is secured at its engaged and attached surfaces.

62. The method as defined in claim 59, further comprising the step of:
   e. laying-up the spar heel in a mold and forming the spar heel into a structural member by subjecting it to the heat and pressure of a curing cycle.

63. A method of fabricating a composite aerodynamic rotor blade assembly utilizing a single matched die mold, the assembly including: a cap member having an outer surface which defines a leading edge of the blade and an inner surface with a nose block engaging portion, a spar engaging portion and an aft fairing skin member engaging portion; a nose block having a spar engaging surface; a spar heel, a spar having a root end and an outer surface with a spar heel engaging portion; an aft fairing structure which defines a trailing edge of the blade and comprises a lightweight core having front, rear, top and bottom surfaces, and a skin member secured to each one of the top and bottom surfaces; and a tip cover having a surface which engages the cap member and the skin members, the method comprising the steps of:
   a. forming the aft fairing structure in a bonding assembly jig as a subassembly including a lightweight core having front, rear, top and bottom surfaces, a skin member secured to each one of the top and bottom surfaces and a spar heel secured to the front surface of the core and to each skin member;
   b. laying-up the spar in the single matched die mold;
   c. laying-up the nose block in the single matched die mold;
   d. placing the cap member, the aft fairing structure and the tip cover into the single matched die mold with:
      (i) the aft fairing skin member engaging portion of the cap member being attached with an adhesive to the aft fairing skin members, while the nose block engaging portion and the spar engaging portion of the cap member are engaged with the layed-up nose block and the layed-up spar, respectively;
      (ii) the spar engaging surface of the layed-up nose block engaging the layed-up spar;
      (iii) the spar heel engaging portion of the outer surface of the layed-up spar engaging the spar heel; and
      (iv) the tip cover surface engaging the cap member and the skin member; and
   e. forming the layed-up block and layed-up spar into structural members while securing the engaged and attached surfaces to thereby form the composite aerodynamic rotor blade assembly.

64. The method as defined in claim 63, wherein the aft fairing structure includes a trailing edge wedge secured, during the formation of the aft fairing structure to the rear surface of the core and to each skin member.

65. The method as defined in claim 63, wherein the assembly further includes a deicing blanket, wherein during the placement defined in step d) the deicing blanket is placed between the cap member and the layed-up nose block and layed-up spar and attached to the cap member with an adhesive while engaging the layed-up nose block and the layed-up spar, and wherein during step e) the deicing blanket is secured to its engaged and attached surfaces.

66. The method as defined in claim 63, further comprising the step of:
   f. laying-up the spar heel in a mold and forming the spar heel into a structural member by subjecting it to the heat and pressure of a curing cycle.

* * * * *